United States Patent Office 3,499,007
Patented Mar. 3, 1970

3,499,007
ADDITION PRODUCTS OF MALEIC ANHYDRIDE TO POLYALKYLENE ETHERS
Hanswilli von Brachel, Offenbach am Main, and Karl Hintermeier, Frankfurt am Main-Fechenheim, Germany, assignors to Cassella Farbwerke Mainkur Aktiengesellschaft, Frankfurt am Main-Fechenheim, Germany, a company of Germany
No Drawing. Filed Dec. 3, 1965, Ser. No. 511,328
Claims priority, application Germany, Dec. 5, 1964, C 34,568
Int. Cl. C07c 57/14; C08g 51/80
U.S. Cl. 260—346.8    2 Claims

ABSTRACT OF THE DISCLOSURE

Addition products of maleic anhydride and a polyalkylene ether which is free of hydroxyl groups and of a molecular weight of over 400 and the utility thereof as surface active agents, for the production of polyester resins, as anhydride components, for epoxide resins and as raw materials for lacquers and textile auxiliaries.

From Journal of Organic Chemistry 28, page 3036 it is known that maleic anhydride can be added to tetrahydrofuran, in the presence of radical initiators, according to the following scheme:

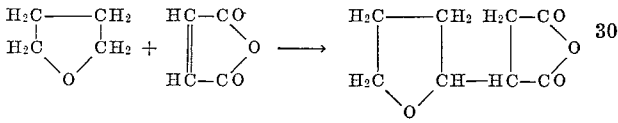

Moreover, said reference mentions that, in contrast to the tetrahydrofuan, tetrahydropyran and 1,4-dioxane do not yield such adducts.

Therefore, it could be supposed that the realization of the reaction depends on the ring strain of the cyclic ethers, which strain reaches, as is known, its optimum in the tetrahydrofuran but, in the case of the next of higher cyclic ethers being six-membered, does obviously no longer suffice to permit the addition of the maleic anhydride. In view of these facts, so much the less could be expected that said reaction may be realized in the case of polyethers having a straight or branched chain.

Surprisingly, we now have found that maleic anhydride may be added in the presence of radical initiators, with excellent yields, in a chain reaction, to polyalkylene ethers that do not possess free OH-groups and whose molecular weight is beyond 400. The following products are, for example, suited as polyalkylene ethers: polyethylene oxides, polypropylene oxides, polybutylene oxides, and the corresponding mixed polyalkylene oxides; furthermore, there may be mentioned the oxalkylation products of mono and polyhydric alcohols, phenols, and carboxylic acids as well as the products obtained from the reaction of polyalkylene oxides and oxalkylation products with isocyanates, provided that their molecular weights are beyond 400 and that free hydroxy groups possibly being primarily present are blocked by acylation, etherification etc. or replaced by halogen atoms.

The quantity of the maleic anhydride may be widely varied. In general, however, not more than ½ mol maleic anhydride is employed per oxygen atom of the ether group. The reaction may take place in the presence or absence of inert solvents, such as hydrocarbons, esters or polyhalogen compounds. The reaction-temperatures are dependent on how the radical initiators employed tend to disintegrate. Generally, the reaction is run at a temperature of 80–160° C. As radical initiators there may be used, for example: diacylperoxides, such as benzoylperoxide, chlorobenzoylperoxide or alkylacylperoxides, tert-butylperbenzoate and preferably dialkylperoxides, such as di-tert-butylperoxide, tert-butyl-cumylperoxide and dicumylperoxide. The reaction-times depend on the reaction-temperature, the half-life values of the radical initiators and the employed quantities of the reactants. Generally speaking, a 5 to 15 hours' heating is sufficient. Maleic anhydride being possibly unreacted may easily be eliminated by distillation.

It is, therefore, an object of the invention to provide addition products consisting of maleic anhydride added to a polyalkylene ether, free from hydroxyl groups, with a molecular weight of beyond 400, having the formula $$R-C_nH_{2n}-O\mathrm{[}C_nH_{2n}-O\mathrm{]}_mC_nH_{2n}-R$$

wherein R is a member of the group consisting of O-alkyl, O-aryl, O-acyl, O-benzyl, and halogen, $n$ is an integer of 2 through 18, $m$ is an integer of 5 through 500, the molar ratio between the maleic anhydride and the polyalkylene ether ranging from 1:1 to $$\frac{m}{2}:1$$

The novel adducts under the present invention can be used for diversified purposes. They show surface activity. Furthermore, they are suited, for example, for the production of polyester resins, as anhydride components for epoxide resins and as raw materials for lacquers and textile auxiliaries.

The following examples will further illustrate how our invention may be carried out in practice, but the invention is not restricted to these examples. All degrees are degrees centigrade. The figures as given in the names of the polyethylene ethers used as starting materials indicate the molecular weight.

Example 1

704 g. (=1 mol) polypropylene glycol-620 diacetate free from basic impurities are heated, whilst stirring, together with 392 g. (=4 mols) maleic anhydride, in a nitrogen atmosphere to a temperature of 130–135° for 3 hours during which time 30 cc. di-tert-butylperoxide are added dropwise. Especially in the beginning, the reaction takes a highly exothermic course. After stirring the solution for a further 15 hours, at 130–135°, the reaction is completed, which can be recognized from the fact that, when applying a vacuum of 1–2 mm. Hg, no maleic anhydride is distilling off.

After cooling down the reaction mixture, a light brown, high viscous resin is obtained that dissolves in dilute lye without a residue.

Similar products are obtained by reacting, according to the process as given above, polypropylene glycol-420 diacetate with 3 mols maleic anhydride, polypropylene glycol-1020 diacetate with 4.5 and 6 mols maleic anhydrides, polypropylene glycol-2020 diacetate with 12 mols maleic anhydrides, and polypropylene glycol-4020 diacetate with 20 and with 25 mols maleic anhydrides.

The polypropylene glycol-620 diacetate used as starting material in the above example, may be prepared in the following manner:

1240 g. (=2 mols) polypropylene glycol having an average molecular weight of 620 are dissolved in 620 cc. toluene and are admixed with a strongly acid cation-exchanger. The solution is freed from water by azetropoic distillation in the course of several hours, whilst being thoroughly stirred, whereby the cation-exchanger retains the base-residues still present in the polypropylene glycol, which residues come from the production thereof. The solution is now freed from the exchanger by filtration, admixed with 450 g. (=4.4 mols) acetic anhydride and heated for 2 hours to a temperature of 105–110°. Finally, the toluene, the acetic acid, and the excess acetic anhydride are filtered off in the vacuum. As a residue remains the polypropylene glycol-620 diacetate that is obtained as a yellow-colored oil in an almost quantitative yield.

In an analogous manner can also be prepared the other diacetates or acetates of polyalkylene glycols utilizable as starting materials under the present invention.

Example 2

123 g. (=1/10 mol) polypropylene glycol-1020 dibenzoate free from basic compounds, are heated, whilst stirring, for 15 hours to 130–135° together with 49 g. (=1/2 mol) maleic anhydride and 8 cc. di-tert-butylperoxide in a carbon dioxide atmosphere. After cooling down, a light brown, viscous resin is obtained that dissolves completely in dilute sodium hydroxide solution as well as in acetone and methanol.

A similar result is obtained by reacting, in an analogous manner, polypropylene glycol-1020 dichloride or polypropylene glycol-1020 di-succinic acid mono ester with maleic anhydride in a molar ratio of 1:5.

The polyproylene glycol-1020 dibenzoate used as starting material in the above example may be prepared in the following manner:

510 g. polypropylene glycol-1020 (=1/2 mol) are dissolved in pyridine and acylated with 155 g. (=1.1 mol) benzoyl chloride at room temperature. The reaction mixture is then poured into ice water and extracted with ether. The layer of ether is washed several times with dilute salt water and dried. After distilling off the ether, the benzoylation product is obtained as a residue, from which the pyridine residues are removed by heating to 150° whilst passing through a nitrogen current.

Example 3

464 g. (=1 mol) of the acetate of the compound formed by the addition of 6 mols propylene oxide to 1 mol n-butanol are heated, whilst stirring, to 130° together with 294 g. (=3 mols) maleic anhydride in a nitrogen atmosphere. Thereafter, 20 cc. di-tert-butylperoxide are added dropwise during 5 hours and the mixture is stirred for 10 hours, at 130–135°.

By cooling down the mixture, the adduct is obtained in the form of a high-viscous, light brown resin.

Example 4

217 g. (=1/5 mol) polyethylene glycol-1000 diacetate and 118 g. (=6/5 mol) maleic anhydride are heated, whilst stiring, to 130° in a carbon dioxide atmosphere. Subsequently, 20 cc. di-tert-butylperoxide are added drop by drop during 3 hours and the mixture is then stirred for a further 10 hours, at 130–135°.

The reaction is then completed and, when cooling down, a viscous, brown resin is obtained that dissolves in dilute lye, acetone, and hot methanol to give a limpid solution.

A similar result is obtained when using, in place of the polyethylene glycol-1000 diacetate, the equivalent amount of a polyethylene glycol-1000 diether.

Example 5

339 g. (=1/2 mol) of the diacetate of the compound formed by the addition of 7 mols butylene oxide and 1 mol butane-1,4-diol are heated, whilst stirring, to 130–135° together with 244 g. (=2.5 mols) maleic anhydride. Subsequently, 20 cc. di-tert-butylperoxide are added dropwise in the course of 4 hours and lastly the mixture is stirred for 15 hours, at 130–135°. The addition reaction is then completed and no more maleic anhydride can be distilled off from the reaction mass. Thus, after cooling down, a high viscous, light brown colored resin is obtained that dissolves in dilute lye without a residue.

Example 6

In the course of 4 hours, at a temperature of 130–135°, 20 cc. di-tert-butylperoxide are added dropwise, whilst stirring, to 1 mol esterified polypropylene glycol-3300, and 15 mols maleic anhydride and the mixture is then kept at this temperature for a further 15 hours. After this period of time, no more maleic anhydride can distilled off from the reaction mass, when applying a high vacuum. After cooling down, a high-viscous, light brown colored resin is obtained that dissolves in dilute lye. As esters, there have been used the esters of the valeric acid, lauric acid, palmitic acid, stearic acid, and oleic acid.

Example 7

400 g. maleic anhydride are added to a polyester consisting of 5 mols adipic acid and 4 mols polypropylene glycol-400 (having an acid number of 42), the solution is heated to 130° and then 60 cc. di-tert-butylperoxide are added dropwise during 8 hours. Thus, a yellow colored resin is obtained that can be cross-linked, at temperatures beyond 100°, with diepoxides such as, for example, the diglycidyl ether of the dihydroxy-diphenyl propane or the diglycidyl ether of the butanediol. The same result is achieved by using, in place of the adipic acid, azelaic acid (940 g.), sebacic acid (1010 g.), phthalic anhydride (740 g.), or isophthalic acid (830 g.).

Example 8

200 g. of a polypropylene glycol copolymer having a molecular weight of 18,000 and containing the two monomers in a molar ratio of 4:1, are esterified with benzoyl chloride according to the prescription given in Example 2. The ester liberated from the pyridine is heated for 12 hours to 130–135° together with 12 g. maleic anhydride and 3 cc. di-tert-butylperoxide in a carbon dioxide atmosphere. Thus, a product is obtained that dissolves in organic solvents and can be vulcanized by 10 hours' heating to 140° to give an elastic and ozone-resistant rubber, after 10–30% by weight activated soot has been rolled in and 8–15% ethylene glycol diglycidyl ether has been added.

Example 9

1 mol of a polypropylene glycol ester prepared by propoxylation of lauryl alcohol with 10 mols propylene oxide is esterified with acetic anhydride and, after distilling off the glacial acetic acid with 3 mols maleic anhydride and 25 cc. di-tert-butylperoxide, the solution is heated to 130–135° for 12 hours. Thus, a polymer is obtained, whose alkali salts may be used as a weakly foaming emulsifier. Similar products are obtained by employing, in place of the lauryl alcohol, ethyl hexanol, hexadecanol, octadecanol, nonylphenol or dodecylphenol.

Example 10

A polyalkylene glycol-3000 having been prepared by the reaction of amyl alcohol with the epoxides of a mixture of $C_8$–$C_{14}$-olefines is esterified with acetic anhydride in the presence of pyridine. To this ester are added 7 mols maleic anhydride and 30 cc. ditert-butylperoxide and the solution is then heated to 125–130° for 15 hours. Thus, a polymer is obtained, whose sodium salt may be used as a defoamer.

We claim:
1. An addition product of maleic anhydride added to a polyalkylene ether at a temperature between 80 and 160° C. and in the presence of a radical initiator, said polyalkylene ether being free from hydroxyl groups, having a molecular weight greater than 400 and having the formula

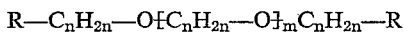

wherein R is a member selected from the group consisting of O-alkyl, O-phenyl, O-benzyl, halogen and O-acyl wherein acyl stands for the residue of a member selected from the group consisting of acetic, valeric, lauric, oleic, succinic, adipic, azelaic, sebacic, benzoic, phthalic, isophthalic, palmitic and stearic acid; $n$ is an integer of 2 through 18; $m$ is an integer of 5 through 500 and the molar ratio between the maleic anhydride and the polyalkylene ether is between 1:1 and $$\frac{m}{2}:1$$

2. The addition product of claim 1 wherein acyl stands for the residue of acetic acid.

References Cited

UNITED STATES PATENTS

| 2,973,344 | 2/1961 | Fasie | 260—78.40 |
| 3,141,897 | 7/1964 | Crecelius et al. | 260—346.8 |

OTHER REFERENCES

Hackh's Chemical Dictionary, page 18 (second edition).

ALEX MAZEL, Primary Examiner

B. I. DENTZ, Assistant Examiner

U.S. Cl. X.R.

252—8.9, 356; 260—2, 47, 75, 78.4, 347.3, 347.4